US011240216B2

(12) United States Patent
Vijayasankar et al.

(10) Patent No.: US 11,240,216 B2
(45) Date of Patent: *Feb. 1, 2022

(54) ENHANCED NETWORK SECURITY USING PACKET FRAGMENTS

(71) Applicant: TEXAS INSTRUMENTS INCORPORATED, Dallas, TX (US)

(72) Inventors: Kumaran Vijayasankar, Allen, TX (US); Mehul Soman, Dallas, TX (US); Arvind Kandhalu Raghu, Dallas, TX (US); Il Han Kim, Allen, TX (US)

(73) Assignee: Texas Instmments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/722,371

(22) Filed: Dec. 20, 2019

(65) Prior Publication Data

US 2020/0127979 A1 Apr. 23, 2020

Related U.S. Application Data

(63) Continuation of application No. 15/143,460, filed on Apr. 29, 2016, now Pat. No. 10,608,998.

(51) Int. Cl.
*H04L 29/06* (2006.01)
*H04L 29/08* (2006.01)
(Continued)

(52) U.S. Cl.
CPC ........ *H04L 63/061* (2013.01); *H04L 63/0428* (2013.01); *H04L 67/141* (2013.01);
(Continued)

(58) Field of Classification Search
CPC ............... H04L 63/0128; H04L 67/141; H04L 41/0806; H04L 63/061; H04L 29/08
(Continued)

(56) References Cited

U.S. PATENT DOCUMENTS

2002/0122462 A1 9/2002 Batra et al.
2003/0039250 A1 2/2003 Nichols et al.
(Continued)

OTHER PUBLICATIONS

Internet Engineering Task Force Request for Comments 7383 (Year: 2014).
(Continued)

*Primary Examiner* — Evans Desrosiers
(74) *Attorney, Agent, or Firm* — Brian D. Graham; Charles A. Brill; Frank D. Cimino

(57) ABSTRACT

A network system comprising a first network element and a second network element. The first network element is programmed to provide the step of first, communicating to the second network element a plurality of configuration parameter sets. Each configuration parameter set corresponds to a respective frame fragment and comprises a parameter value that differs in value from the parameter value in another configuration parameter set in the plurality of configuration parameter sets. The first network element also is programmed to provide the step of second, communicating a frame, to the second network element, in a plurality of frame fragments, wherein each frame fragment in the plurality of frame fragments is communicated according to a respective parameter value in the plurality of configuration parameter sets.

20 Claims, 3 Drawing Sheets

(51) Int. Cl.
  *H04W 12/04* (2021.01)
  *H04W 12/06* (2021.01)
  *H04W 4/70* (2018.01)
  *H04W 12/033* (2021.01)

(52) U.S. Cl.
  CPC ........... *H04W 12/04* (2013.01); *H04W 12/06* (2013.01); *H04L 63/0435* (2013.01); *H04W 4/70* (2018.02); *H04W 12/033* (2021.01)

(58) Field of Classification Search
  USPC ......................................................... 713/171
  See application file for complete search history.

(56) References Cited

U.S. PATENT DOCUMENTS

| | | |
|---|---|---|
| 2004/0103205 A1 | 5/2004 | Larson et al. |
| 2006/0143084 A1 | 6/2006 | Donnelli et al. |
| 2006/0222054 A1 | 10/2006 | Conyers et al. |
| 2007/0230460 A1* | 10/2007 | Jeong .................... H04L 12/66 370/389 |
| 2007/0242686 A1 | 10/2007 | Zegers et al. |
| 2007/0271830 A1 | 11/2007 | Holt et al. |
| 2009/0022073 A1 | 1/2009 | Batra et al. |
| 2009/0168846 A1 | 7/2009 | Filippo, III et al. |
| 2009/0204817 A1 | 8/2009 | Deana-Roga et al. |
| 2009/0303972 A1 | 12/2009 | Flammer, III et al. |
| 2010/0014564 A1 | 1/2010 | Eskildsen et al. |
| 2010/0111007 A1 | 5/2010 | Suo et al. |
| 2010/0138531 A1 | 6/2010 | Kashyap |
| 2010/0202354 A1 | 8/2010 | Ho |
| 2010/0278338 A1 | 11/2010 | Chang et al. |
| 2011/0149759 A1 | 6/2011 | Jollota |
| 2012/0311345 A1* | 12/2012 | Dhuse ................. G06F 12/1408 713/189 |
| 2013/0250928 A1 | 9/2013 | Choi et al. |
| 2014/0036751 A1 | 2/2014 | Xhafa et al. |
| 2014/0245453 A1 | 8/2014 | Himawan et al. |
| 2014/0355502 A1 | 12/2014 | Xhafa et al. |
| 2015/0038130 A1* | 2/2015 | Mao ....................... H04W 8/22 455/418 |
| 2015/0245219 A1 | 8/2015 | Wei |
| 2017/0339133 A1 | 11/2017 | Han et al. |
| 2018/0116004 A1 | 4/2018 | Britt et al. |
| 2018/0248860 A1 | 8/2018 | Xhafa et al. |
| 2018/0376495 A1 | 12/2018 | Lee et al. |

OTHER PUBLICATIONS

Institute of Electrical and Electronics Engineers Std 802.15.4e-2012 (Year: 2012).
Institute of Electrical and Electronics Engineers Std 802.15.4-2015 (Year: 2015).
Part 15.4: Low Rate Wireless Personal Area Networks (LR-WPANs), Amendment 1: MAC sublayer, IEEE Std. 802.15.4e.2012 (Amendment to IEEE Std. 802.15.4-2011), Apr. 16, 2012, 225 pages.
NPL Search Innovation Q Plus IP.com; Jun. 6, 2020; 1 page.

* cited by examiner

ENHANCED NETWORK SECURITY USING PACKET FRAGMENTS

CROSS-REFERENCES TO RELATED APPLICATIONS

This application is a continuation of prior U.S. application Ser. No. 15/143,460, filed Apr. 29, 2016, which is herein incorporated by reference in its entirety.

STATEMENT REGARDING FEDERALLY SPONSORED RESEARCH OR DEVELOPMENT

Not Applicable.

BACKGROUND OF THE INVENTION

The preferred embodiments relate to network element communications and, more particularly, to improved security of such communications and to protect against third party security threats.

Network elements (or nodes) are typically logical entities that communicate onto a telecommunication or computing system network, so as to communicate with at least one other network element, according to a common network management scheme that involves various layers of protocol. These various layers provide a conceptual model, where one well known example is the Open Systems Interconnection (OSI) model. In this and comparable models, each network layer has an associated protocol and, other than the lowermost physical layer, is served by a layer beneath it. In the OSI model, the highest layer, which interacts with an end user, is the application layer, and beneath it are several layers. The second lowest layer is the data link, which is sometimes called the Media Access Control or MAC layer, although a logical link control layer may also be a part of this layer. The MAC layer defines the frame as its protocol data unit and defines the communication over a link between two network elements and the flow control between them. The lowest layer is the physical layer, which is so named as it represents the electrical and physical connectivity of the data communication to/from the physical transmission medium (e.g., cable or wireless frequency) of the network, so as to transmit and receive bits over the medium that represent the frames received from the MAC layer.

While network element communications according to the above principles are widely implemented, various forms of security also have been added so as to protect communications from potential nefarious actions by third parties. Such security may take various forms, such as authentication and encryption. Authentication typically confirms a network element's authority to connect to a network, usually at the commencement of communication (or a communication session). Encryption, however, continues to protect successive communications, for example by encrypting each data frame communicated between two network elements. In this regard, encryption may be implemented at any layer above PHY. In any event, under the encryption methodology, a transmitting network element uses a cryptographic key to encrypt a data frame, after which the encrypted frame is then transmitted and the intended destination receiving network element then decrypts the encrypted frame, with that receiving network element having knowledge of the original encryption key.

Various types of encryption keys and processes exist, and what they have in common is the security is predicated on only the transmitting and receiving network elements having knowledge of the key for a session. In this regard, it is known in the art that nefarious third parties may seek to uncover or otherwise discover an encryption key and, if successful, the party may then intercept frames communicated between the intended proper network elements and, with the key, nefariously decrypt the frames between those elements. Toward this end, also known in the art is that such a wrongdoer may collect and store a number of frames into what is referred to as a "dictionary," and from analyses on such a dictionary determine the encryption key used to encrypt the frames in the dictionary. Having this key, and as stated above, thereby permits unauthorized decryption by the third party of the captured frames.

Recognizing the above, the prior art has developed additional methodologies to reduce the chance of illicit discovery of encryption keys. As a first example, during a communication session, the key may be periodically changed, where such an approach is sometimes referred to as re-keying. Thus, the wrongdoer is prevented from collecting a sufficient amount of frames that are encrypted per a single key, thereby reducing or eliminating the chance of the key being discovered. This approach, however, has various disadvantages, including higher network overhead, potentially having to rekey an entire network, and added complexity in the presence of "sleepy" devices needing to be re-keyed, while not readily accessible if in a sleep state. As a second example, unique session tokens can be generated for every session, whereby the token is further used as part of the encryption/decryption process. This approach also has various disadvantages, including session key maintenance overhead, and it also is susceptible to dictionary attack if a session and its token are maintained over a period of time sufficient to allow the wrongdoer enough information to get past both the encryption key and the accompanying token.

Given the preceding, there arises a need to address certain security issues in network element communications and to improve on the prior art approaches, and the preferred embodiments are directed to such a need as further explored below.

BRIEF SUMMARY OF THE INVENTION

In a preferred embodiment, there is a network system comprising a first network element and a second network element. The first network element is programmed to provide the steps of: (1) first, communicating to the second network element a plurality of configuration parameter sets, wherein each configuration parameter set corresponds to a respective frame fragment and comprises a parameter value that differs in value from the parameter value in another configuration parameter set; and (2) second, communicating a frame, to the second network element, in a plurality of frame fragments, wherein each frame fragment in the plurality of frame fragments is communicated according to a respective parameter value in the plurality of configuration parameter sets.

Numerous other inventive aspects and preferred embodiments are also disclosed and claimed.

DETAILED DESCRIPTION OF EMBODIMENTS

Figure 1:
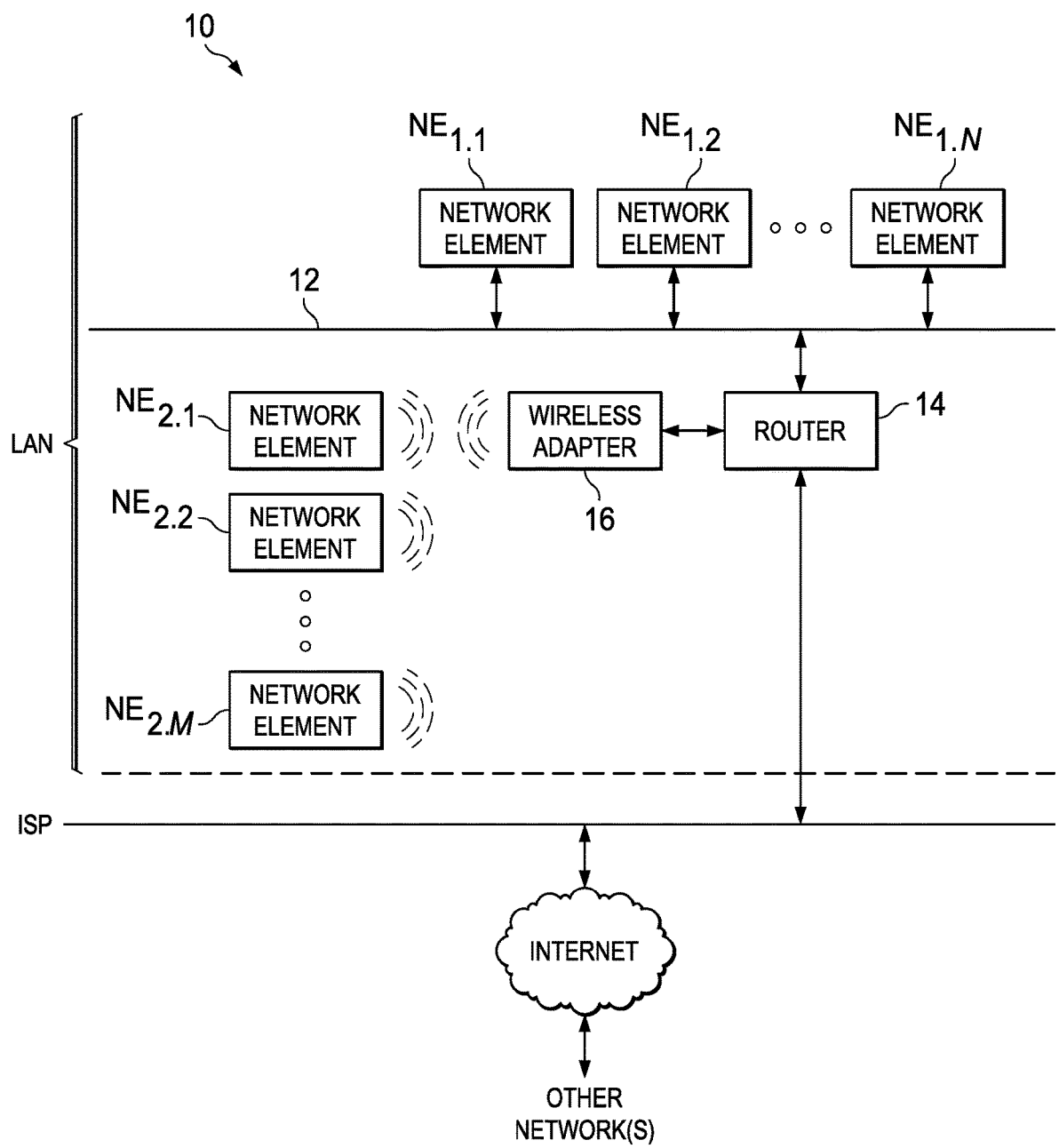
FIG. 1 illustrates an electrical block diagram of a network system 10, according to a preferred embodiment.

FIG. 1 illustrates an electrical block diagram of a network system 10, according to a preferred embodiment. System 10 includes various aspects known in the art which are first described here, followed by additional preferred embodiment aspects described in the remainder of this document. Looking first to the former, system 10 includes a local area network (LAN) shown generally above a horizontal dashed line in the Figure, and the LAN includes a number of well-known items. The LAN also is connected via an Internet Service Provider ISP to the Internet, which itself represents and/or is connected to a network of additional networks, including the elements connected to those networks. Returning to the LAN, it has a physical interface 12 such as a multi-conductor cable, to which are connected a number N of network elements shown as $NE_{1.1}$, $NE_{1.2}, \ldots, NE_{1.N}$. As introduced earlier in the Background Of The Invention section of this document, each of these (and other) network elements referred to herein are logical entities that communicate onto a telecommunication or computing system network; such elements, therefore, may be computers, tablets, personal devices, as well as modules or the like that are anticipated to be prolific in the development of the Internet-of-Things (IoT). Such devices may be constructed of myriad forms of hardware and software (including firmware and the like), with at least the minimal functionality to communicate to another device in the LAN. Further, the network elements may include various other computational or feature functionality, including sensors and response, for example, in the case of network elements serving in an IoT environment. Also connected to physical interface 12 are a router 14, which is further coupled to (or includes) a wireless adapter 16. Wireless adapter 16 is operable to bi-directionally communicate wirelessly with a number M of network elements shown as $NE_{2.1}$, $NE_{2.2}, \ldots, NE_{2.M}$. Router 14 controls the forwarding of data packets among the network elements in the LAN as well as between the LAN and the ISP.

Looking to additional preferred embodiment aspects of system 10, one or more, and preferably all, of its network elements $NE_{1.x}$ and $NE_{2.x}$ are further improved with security protocol programming, as may be implemented in either hardware, software, or a combination thereof, so as to reduce the possibility that encrypted frames communicated by those elements may be decrypted by a nefarious third party. In this regard, FIG. 2 introduces the preferred embodiment frame sequencing of the network elements of FIG. 1, and FIG. 3 details how frames of the sequence are fragmented, for improving security. Each of these aspects is described below.

Figure 2:
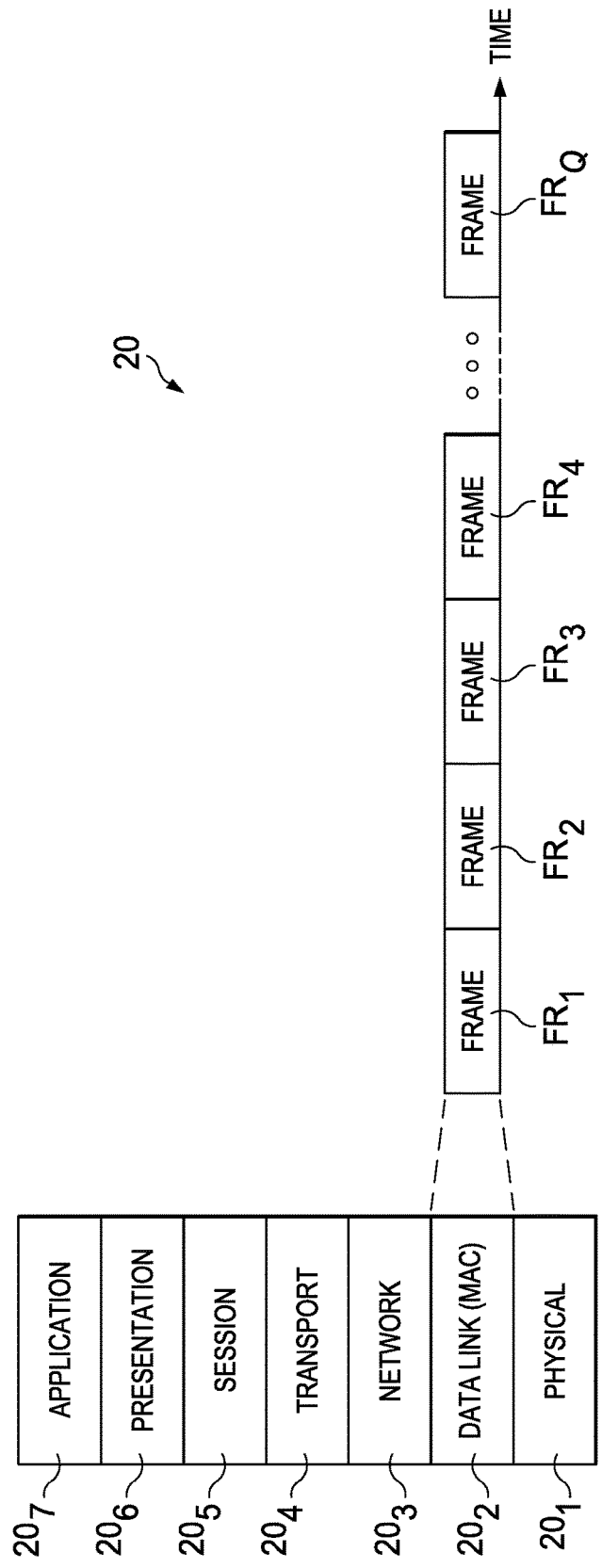
FIG. 2 illustrates the preferred embodiment frame sequencing of the network elements of FIG. 1.

FIG. 2 illustrates a block diagram of frame sequencing according to a preferred embodiment. Generally, the illustration of FIG. 2 alone is known in the art, although modifications beyond the illustration are contemplated and described, so one skilled in the art already will readily understand certain aspects. To the left in FIG. 2 is shown a network layer reference model 20, where the example shown is that provided by OSI. The OSI model 20 has seven layers, which are identified in FIG. 2 by layer name and a reference of $20_v$, where v is the layer number. One skilled in the art will readily recognize these layers and the art is replete with references describing each layer, so a detailed discussion of such aspects is not provided herein. In all events, each layer of model 20 generally has an associated protocol data unit (PDU). In this regard and with respect to a preferred embodiment, FIG. 2 further illustrates that associated with the data link layer $20_2$ the PDU is a frame. The layer $20_2$ frame includes data and other information from higher layers than are encapsulated into a sequence of Q frames, shown in FIG. 2 as communicated over time. Thus, each frame is communicated from data link layer $20_2$ to the underlying physical layer $20_1$, at which point the data is, in the form of bits, communicated by physical layer $20_1$ according to the corresponding media (i.e., wireline, wireless, or both).

Figure 3:
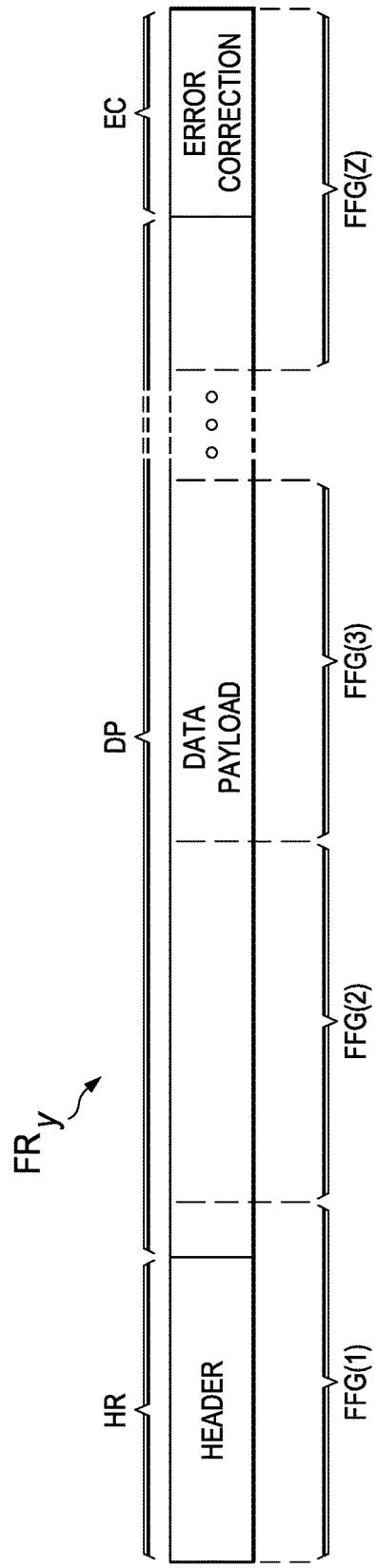
FIG. 3 details frame fragmenting per a preferred embodiment.

FIG. 3 illustrates a block diagram of any of the Q frames from FIG. 2, so the single frame in FIG. 3 is referenced as a frame $FR_y$. As is common in the art, frame $FR_y$ has three portions, a header HR, a data payload DP, and an error correction EC. Header HR is commonly a bit pattern that is distinct from the rest of the bits in frame $FR_y$ and allows synchronization by delineating the start of frame $FR_y$ from the rest of the frame (and from a preceding and possibly subsequent frame). A receiving network element therefore can detect this bit pattern and align the frame for purposes of decoding the remaining information therein. Data payload DP includes user data and also may include control information. The control information permits delivering the payload, and the user data is generally that data which was generated by the transmitting network element for use at the higher layers of the receiving network element. Lastly, error correction EC includes information so that the receiving network element can determine if it accurately received the information contained in the frame, that is, whether the bit values as decoded match that which were transmitted. A typical error correction EC approach is a cyclic redundancy check, and note that error correction EC may be considered its own portion of frame $FR_y$ or some may view it as the ending portion of data payload DP.

According to a preferred embodiment and as further shown in FIG. 3 by vertical dashed lines, for communicating between a transmitting and receiving network element, frame $FR_y$ is divided into an integer number Z of what are referred to herein as frame fragments, shown in FIG. 3 as FFG(1), FFG(2), . . . , FFG(Z). More particularly, for a single ISO layer (e.g., data link $20_2$), the bits of its PDU (e.g., frame) are logically divided into individual groups referred to as fragments, each of which is to be communicated according to a different set of what is now introduced as "configuration parameter set (CPS)." Thus, for sake of reference, the following Table 1 illustrates the FIG. 3 frame fragments FFG(x), each with its own respective CPS:

TABLE 1

| Frame fragment | Configuration parameter set |
| --- | --- |
| FFG (1) | CPS (1) |
| FFG (2) | CPS (2) |
| FFG (3) | CPS (3) |
| . | . |
| . | . |
| . | . |
| FFG (Z) | CPS (Z) |

Each fragment FFG(x), therefore, represents a portion of the frame $FR_y$. Moreover, given the fragmentation described herein, preferably each fragment includes not only a respective portion of frame $FR_y$, as suggested by FIG. 3, but a preferred embodiment also adds a corresponding cyclic redundant check (CRC) or other error correction code solely for the data in the respective fragment, whereas such information was not represented in the original frame $FR_y$. Moreover, the final fragment FFG(Z) will therefore include both this type of CRC for that specific fragment, as well as the error correction code (e.g., also CRC) for the entire frame $FR_y$.

Given Table 1 and the above introduction, therefore, when a transmitting network element transmits a frame $FR_y$ to a receiving network element, a first portion of frame $FR_y$ is transmitted as frame fragment FFG(1) according to a first set of parameter(s) specified in configuration parameter set CPS(1), a second portion of frame $FR_y$ is transmitted as frame fragment FFG(2) according to a second set of parameter(s) specified in CPS(2), and so forth until last portion of frame $FR_y$ is transmitted as frame fragment FFG(Z) according to a last set of parameter(s) specified in CPS(Z). Moreover and as detailed below, the receiving network element is earlier informed of Table 1, so when it is to detect, receive, and decode each incoming frame fragment FFG(x), it does so according to the respective configuration parameter set CPS(x). As detailed below, the difference in respective configuration parameter sets may be a change in one or more parameters associated with each set, such as a change in frequency or PHY mode. Note also that in the preferred embodiment, fragmenting of a frame as shown in FIG. 3 is preferably such that header HR is not fragmented, so that the first frame fragment FFG(1) will include the entire header HR and also may include a portion of data payload DP, for reasons further detailed below.

Figure 4:
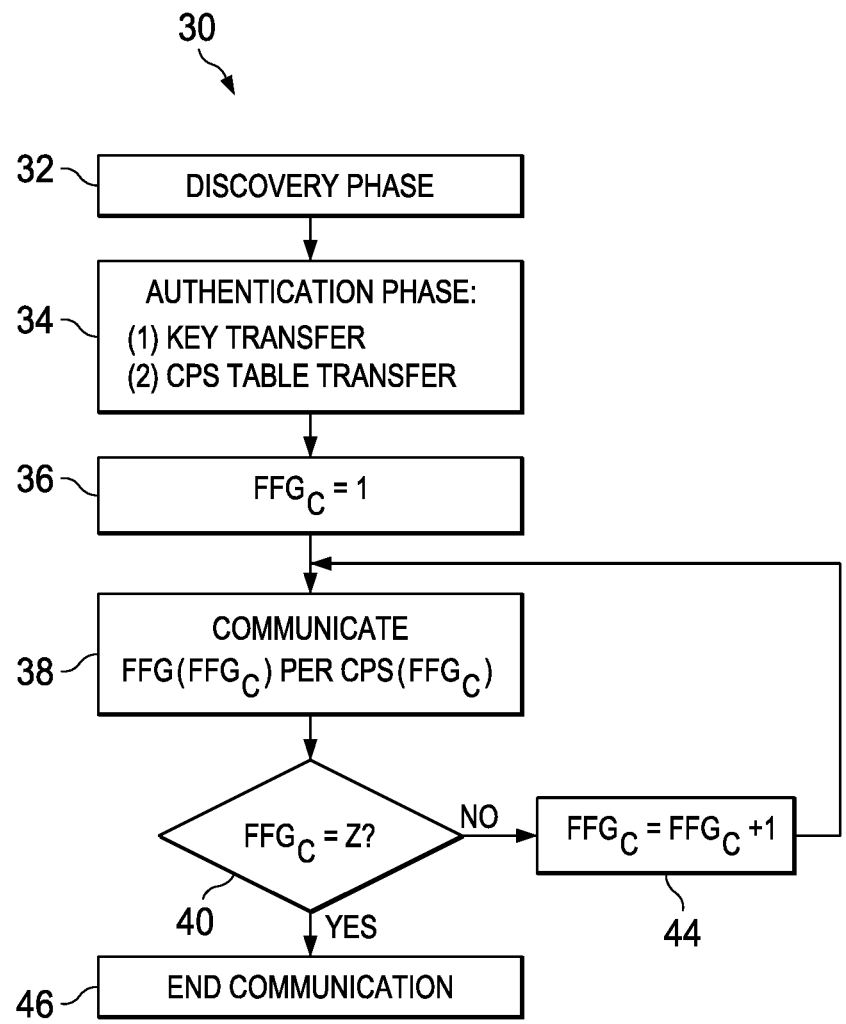
FIG. 4 illustrates a flowchart of a preferred embodiment method of operation of communication between a transmitting and receiving network element.

FIG. 4 illustrates a flowchart of a preferred embodiment method 30 of operation of communication between a transmitting and receiving network element. Method 30 commences with a discovery phase 32, where each of the transmitting and receiving network element establish a connection, or a session, along the network medium and to one another. This discovery phase is followed by a step 34 authentication phase.

In a preferred embodiment and as known in the art, in the step 34 authentication phase, a higher level of security, typically referred to as the Authentication and Key Exchange phase performed at higher levels, is applied as compared to that in subsequent payload data communications. This higher security level better protects information communicated between network elements during the authentication phase. Accordingly, such an increased security level is enforced in step 34, and also per the art a key transfer is accomplished between the transmitting and receiving network element, the key being that by which the transmitting node is encrypting frames and from which the receiving network element can decrypt the encrypted frames it receives from the transmitting network element. In addition to the prior art authentication information transfer, the preferred embodiment also during step 34 communicates the CPS information (e.g., Table 1) from the transmitting network element to the receiving network element. Next, method 30 continues to step 36.

In step 36, an index count value $FFG_C$ is initiated to a value of one. Next, method 30 continues from step 36 to step 38.

In step 38, the transmitting network element communicates the frame fragment FFG, at the current index of $FFG_C$, according to the configuration parameter set CPS at the same index. Thus, in the first instance of step 38 being reached immediately after step 36, then fragment FFG(1) is communicated per the corresponding parameter(s) in set CPS(1). As shown in FIG. 3, therefore, the entire header HR and a portion of data payload DP are thereby transmitted as FFG(1), and since the header HR is not fragmented the likelihood of its successful receipt and decoding are improved, as compared to the alternative were the header permitted to be fragmented. Further, and by way of example, in one preferred embodiment and as introduced earlier, the CPS per fragment may differ from another by a change in transmission frequency. In such a case, in the first instance of step 38 being reached immediately after step 36, then fragment FFG(1) is transmitted by the transmitting network element at a set CPS(1) that specifies a frequency value of freq(1). Moreover, because Table 1 was previously communicated to the receiving network element (during step 34), then in the first instance of step 38 being reached immediately after step 36, the receiving network element tunes to freq(1) to detect the arrival (and to facilitate the decoding) of frame fragment FFG(1). Next, method 30 continues from step 38 to step 40.

In step 40, the transmitting network element determines if all frame fragments for the current frame have been communicated, which is accomplished in a preferred embodiment by comparing the current count of the index $FFG_C$ to the total number Z, of frame fragments in a frame. If the count has not yet reached Z, then method 30 continues from step 40 to step 44, whereas if the count has reached Z, then method 30 continues from step 40 to step 46.

In step 44, the current count of the index $FFG_C$ is incremented and the flow returns to step 38. In such an instance, therefore, step 38 again communicates a frame fragment from the transmitting network element to the receiving network element, in this case at the increased index of $FFG_C$. Hence, if the immediately preceding instance of step 38 communicated fragment FFG(1) per the corresponding parameter(s) in CPS(1), which again as an example could involve a transmission frequency freq(1), then in this next instance of step 38 the transmitting network element transmits fragment FFG(2) according to set CPS(2), thereby transmitting it at a different frequency value of freq(2). Method 30 then continues to another instance of step 40, so that the methodology will repeat until all Z frame fragments have been communicated, each at a preferably different frequency value from the value of at least one (or all) of the frequencies used for other fragments of the frame.

Once all Z frame fragments have been communicated, method 30 concludes with step 46, where communication of the frame (and/or session) is ended. Given the preceding, therefore, one skilled in the art should appreciate that, where frequency is the change in CPS for each instance of step 38, then in effect method 30 implements frequency hopping, not with respect to the context of the prior art which concerns itself with individual frames and channel interference, but instead with respect to separating frame fragments, according to one preferred embodiment. As a result, a third party attack is thwarted in that the chances of successfully capturing each of the frame fragments (e.g., into a "dictionary") is greatly reduced, given the change in CPS (e.g., frequency) for each frame fragment. Indeed, for a protocol/hardware that already contemplates frequency hopping for entire frames, the preferred embodiments may be implemented further with respect to frame fragments, with relatively small additional complexity. Of course, the preferred embodiments also may be implemented in a system that did not originally contemplate frequency hopping, where the system may be readily modified by one skilled in the art so as to achieve the fragment/respective frequency change described above. In all events, therefore, with a relatively low overhead change, the preferred embodiment reduces the drawbacks of the prior art.

In an alternative preferred embodiment, method 30 is again conducted, where instead of frequency differentiating one CPS from another, the change in parameter between successive CPS values is based on a change in PHY mode. Thus, Table 1 would be represented in this instance as shown in the following Table 2:

TABLE 2

| Frame fragment | Configuration parameter set | PHY mode |
|---|---|---|
| FFG (1) | CPS (1) | PHY (1) |
| FFG (2) | CPS (2) | PHY (2) |
| FFG (3) | CPS (3) | PHY (3) |
| • | • | • |
| • | • | • |
| • | • | • |
| FFG (Z) | CPS (Z) | PHY (Z) |

Per Table 2, therefore, as the count $FFG_C$ is incremented, for each successive frame fragment $FFG(FFG_C)$, a corresponding change in PHY mode $PHY(FFG_C)$ is likewise implemented in the transmission, and receipt/detection/decode of the fragment. In this alternative, therefore, each frame fragment $FFG(FFG_C)$ may be communicated at a same frequency and thus without frequency hopping, with instead a change in the PHY mode value for each fragment. One example of such a PHY mode change may be implemented by a change in the encoder polynomials, so that in this preferred embodiment a first encoder polynomial value is used to transmit (and receive) FFG(1), a second encoder polynomial value for FFG(2), and so forth for subsequent fragments. Another example of PHY mode change may be implemented by a change in the manner of scrambling bits, where the latter could be the manner in which bits are interleaved—thus, in this preferred embodiment a first interleaving pattern is used to transmit (and receive) FFG(1), a second interleaving pattern for FFG(2), and so forth. Again, therefore, a third party attack is thwarted in that the chances of successfully capturing each of the frame fragments is significantly reduced, as the security of the frame communication is enhanced by using a secure sequence of fragments, with each fragment being communicated along a time sequence of fragments but according to a change in at least one parameter for the communicated fragment.

Given the preceding, the preferred embodiments provide a network system with network element communications that improve on the prior art by reducing third party security threats. While various aspects have been described, substitutions, modifications or alterations can be made to the descriptions set forth above without departing from the inventive scope. For example, while a change in a single parameter among the configuration parameter sets has been shown, in an alternative preferred embodiment multiple parameters may be changed between such sets. As another example, while the changing parameters described above include frequency and PHY mode, others may be contemplated or ascertained by one skilled in the art, given the present inventive teachings. As still another example, various of the flowchart steps may be re-ordered or further modified (including adding additional steps). Still other examples will be ascertainable by one skilled in the art and are not intended as limiting to the inventive scope, which instead is defined by the following claims.

The invention claimed is:

1. A method comprising:
   transmitting a frame of data from a first network element to a second network element over a network, wherein:
   the frame of data includes a first fragment and a second fragment; and
   the transmitting of the frame of data includes:
      transmitting the first fragment over the network according to a first configuration parameter, the first fragment including a first set of error correction code corresponding to the first fragment; and
      transmitting the second fragment over the network according to a second configuration parameter that is different from the first configuration parameter, the second fragment including a second set of error correction code corresponding to the second fragment.

2. The method of claim 1, wherein the second configuration parameter is different from the first configuration parameter in at least one of frequency or a physical layer mode.

3. The method of claim 1, wherein the second configuration parameter is different from the first configuration parameter in at least one of an encoder polynomial parameter value or an interleaver pattern parameter value.

4. The method of claim 1, wherein a security level of the second configuration parameter is different from a security level of the first configuration parameter.

5. The method of claim 1 further comprising transmitting a mapping between the first fragment and the first configuration parameter and between the second fragment and the second configuration parameter from the first network element to the second network element.

6. The method of claim 5 wherein the transmitting of the mapping is performed at a level of security that is different from a level of security at which the first fragment is transmitted and a level of security at which the second fragment is transmitted.

7. The method of claim 1, wherein the frame of data is a data link frame.

8. The method of claim 1, wherein the first network element and the second network element each include an Internet of Things network element.

9. A device configured to:
   communicatively couple to a network element over a network;
   divide a frame into a plurality of frame fragments that includes a first frame fragment and a second frame fragment;
   transmit the first frame fragment to the network element over the network according to a first set of configuration parameters, the first frame fragment including a first set of error correction code corresponding to the first frame fragment; and
   transmit the second frame fragment to the network element over the network according to a second set of configuration parameters that is different from the first set of configuration parameters, the second frame fragment including a second set of error correction code corresponding to the second frame fragment.

10. The device of claim 9 further configured to transmit a mapping between the first frame fragment and the first set of configuration parameters and between the second frame fragment and the second set of configuration parameters to the network element over the network.

11. The device of claim 10, wherein the device is configured to transmit the mapping at a security level that is different from a security level at which the first frame fragment is transmitted and a security level at which the second frame fragment is transmitted.

12. The device of claim 9, wherein a transmission frequency of the first set of configuration parameters is different from a transmission frequency of the second set of configuration parameters.

13. The device of claim 9, wherein an encoder polynomial parameter value of the first set of configuration parameters is different from an encoder polynomial parameter value of the second set of configuration parameters.

14. The device of claim 9, wherein an interleaver pattern value of the first set of configuration parameters is different from an interleaver pattern value of the second set of configuration parameters.

15. A method comprising:
transmitting a first frame fragment by a first network element to a second network element over a physical transmission medium according to a first configuration parameter set, the first frame fragment including a first set of error correction code corresponding to the first frame fragment; and
transmitting a second frame fragment by the first network element to the second network element over the physical transmission medium according to a second configuration parameter set that is different from the first configuration parameter set, the second frame fragment including a second set of error correction code corresponding to the second frame fragment.

16. The method of claim 15 further comprising:
transmitting, by the first network element to the second network element over the physical transmission medium, a mapping between the first frame fragment and the first configuration parameter set and between the second frame fragment and the second configuration parameter set.

17. The method of claim 15, wherein the first configuration parameter set specifies a transmission frequency that is different from a transmission frequency that is specified by the second configuration parameter set.

18. The method of claim 15, wherein the first configuration parameter set specifies a physical layer configuration that is different from a physical layer configuration that is specified by the second configuration parameter set.

19. The method of claim 1, wherein the second fragment includes a third set of error correction code corresponding to the frame of data.

20. The method of claim 1, wherein the first fragment includes a header of the frame of data and a first portion of a payload of the frame of data, and wherein the second fragment includes a second portion of the payload of the frame of data.

* * * * *